United States Patent [19]

Whitehouse et al.

[11] 3,868,624

[45] Feb. 25, 1975

[54] APPARATUS FOR MAPPING ACOUSTIC FIELDS

[75] Inventors: Harper John Whitehouse; Tibor G. Horwath, both of San Diego, Calif.

[73] Assignee: The United States of America as represented by the Secretary of the Navy, Washington, D.C.

[22] Filed: Dec. 29, 1972

[21] Appl. No.: 319,124

[52] U.S. Cl.......... 340/8 R, 179/111 R, 307/88 ET, 310/9.7
[51] Int. Cl. ............................................. H04b 13/00
[58] Field of Search...307/88 ET; 179/111 R, 111E, 310/9.7; 390/8, 9, 10; 333/30 R

[56] References Cited
UNITED STATES PATENTS

| | | | |
|---|---|---|---|
| 1,759,811 | 5/1930 | Edelman | 179/111 R |
| 1,826,952 | 10/1931 | Potter | 179/111 R |
| 2,567,889 | 9/1951 | Moreland, Jr. | 179/111 R |
| 3,000,461 | 9/1961 | Hasbrook | 181/5 T |
| 3,060,423 | 10/1962 | Goldan | 343/16 M |
| 3,118,979 | 1/1964 | Sessler et al. | 179/111 R |
| 3,373,251 | 3/1968 | Seeler | 179/111 R |
| 3,588,382 | 6/1971 | Reedyk | 307/88 ET |
| 3,705,312 | 12/1972 | Sessler et al. | 179/111 E X |

*Primary Examiner*—Benjamin A. Borchelt
*Assistant Examiner*—H. J. Tudor
*Attorney, Agent, or Firm*—Richard S. Sciascia; Ervin F. Johnston; John Stan

[57] ABSTRACT

Apparatus useful for mapping fields in the range of infrasonic to ultrasonic, comprising a distributed electrostatic transducer, functioning as a strip transmission line, which includes a flat, substantially rectangular, metal plate, one surface of which is rough, the plate having a length generally in the range of 10 to 100 wavelengths of the frequency at which the mapping is to be done. A rectangular strip of dielectric foil is disposed under tension on the rough surface of the metal plate so that the foil touches only the most protruding parts of the surface. A long, narrow, rectangular, metallic strip is disposed on and attached to the dielectric foil, the strip being exposed to, and therefore defining, an acoustic pressure field.

A duplexer is electrically connected to the metallic strip and to the flat plate, and is connectable to a source of input signals, and has output terminals at which the output signal may be measured. The result being that, when an electromagnetic delta function is applied at the input to the duplexer, electromagnetic waves travel along the strip transmission line, the duplexer having the function of separating the returning signal reaching the output terminals of the duplexer from the outgoing signal which is interrogating the line. The returning signal contains two groups of frequencies: (1) low-frequency components identical to those present in the acoustic pressure field, and (2) high-frequency components containing wave vectors, also present in the acoustic pressure field, the two components being readily separable, and hence the pressure field may be reconstructed.

2 Claims, 10 Drawing Figures

*Apparatus for Mapping an Acoustic Pressure Field, Including a Distributed Electrostatic Transducer.*

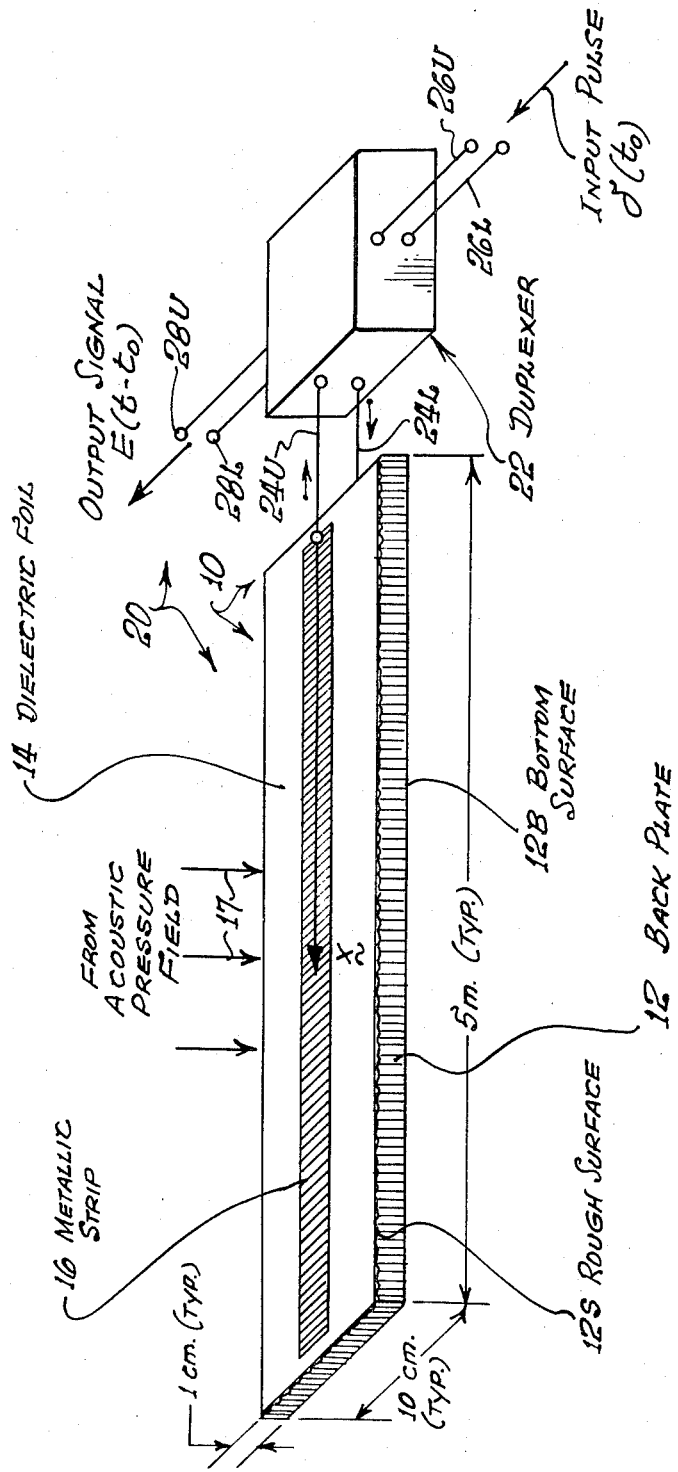
Fig. 1. Apparatus for mapping an acoustic pressure field, including a distributed electrostatic transducer.

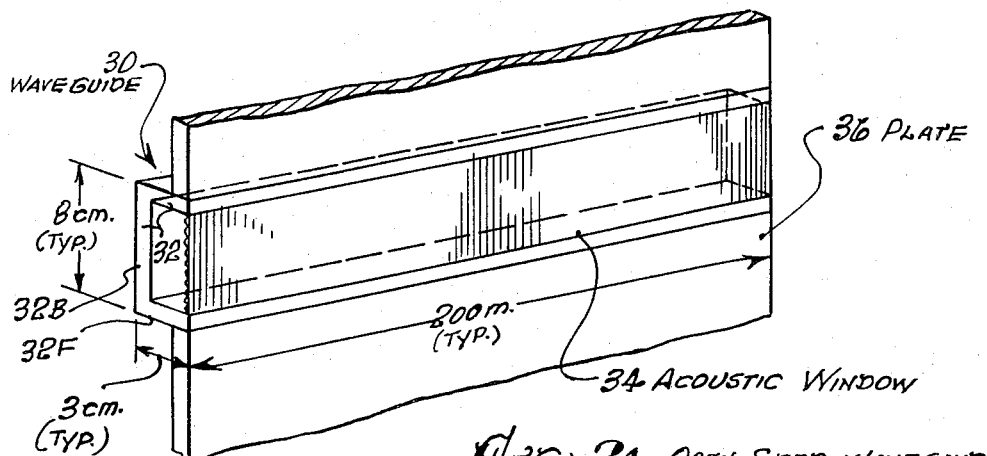
FIG. 2A. OPEN-SIDED WAVEGUIDE
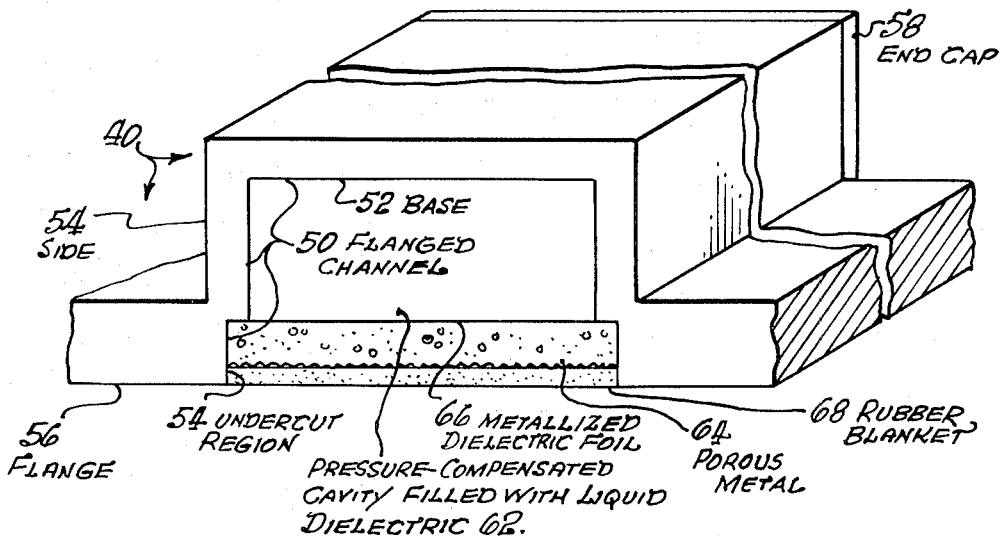
FIG. 2B. PLATE-MOUNTED CONFORMAL WAVEGUIDE SENSOR.
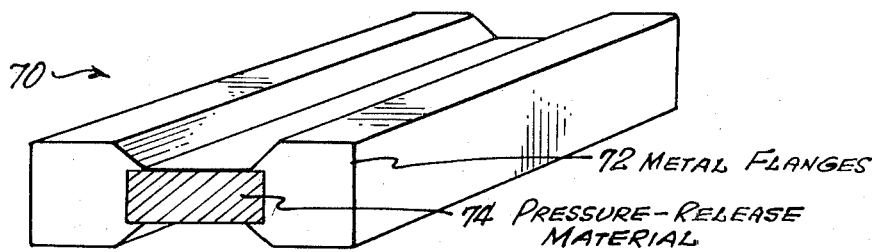
FIG. 2C. DOUBLE-RIDGE WAVEGUIDE
FIG. 2. ELECTROSTATIC TRANSDUCERS IN THE FORM OF WAVEGUIDES.

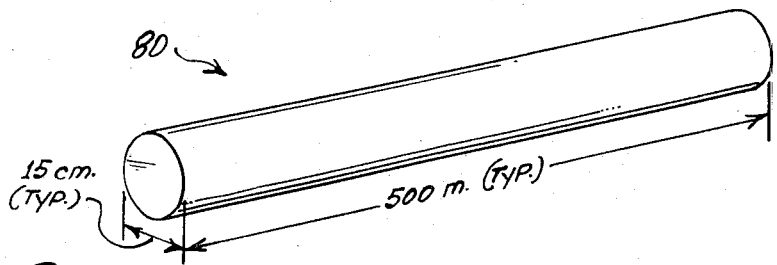
FIG. 3. DIELECTRIC ROD WAVEGUIDE
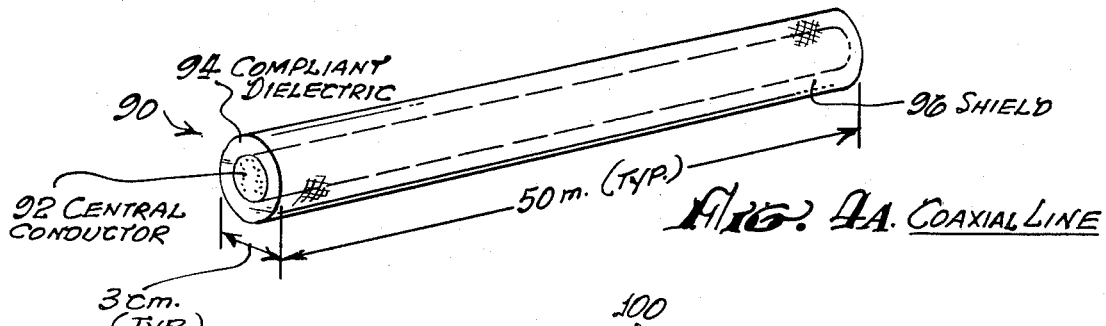
FIG. 4A. COAXIAL LINE
FIG. 4B. COAXIAL LINE WITH TWO METALLIC FOILS.
FIG. 4. DISTRIBUTED ELECTROSTATIC TRANSDUCERS IN THE FORM OF COAXIAL CABLES.
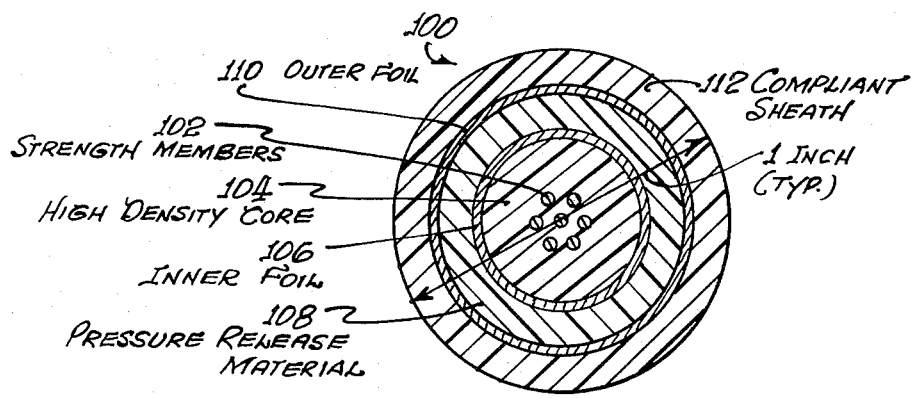
FIG. 5. DISTRIBUTED ELECTROSTATIC TRANSDUCER HAVING DISCRETE TRANSDUCER ELEMENTS.

3,868,624

APPARATUS FOR MAPPING ACOUSTIC FIELDS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a new apparatus and method of mapping acoustic pressure fields. It utilizes the interaction of the acoustic field with a high frequency electromagnetic wave in a distributed transducer. The inherent capability of the concept of operating with high data rates without undue complexity of implementation renders it attractive to applications requiring high resolution and high speed.

The concept has the potential of giving rise to novel technologies in the areas of acoustic imaging, acoustic holography, and sonar. The apparatus of this invention has applications for mapping acoustic fields in the lower acoustic to radio-frequency ranges up to about 10MHz. It may be used in the air, in water, or underground for seismic applications.

Present methods of mapping acoustic fields are either based on scanning the field with a single directional transducer, or sampling it with a number of individual transducer elements combined in an array. The former exhibits an inherent slowness as a result of bandwidth limitations, while the latter requires parallel access to all individual transducer elements of the array and hence a multitude of electrical connections. Since for a given frequency the resolution of the array will depend on the number of its transducer elements, as well as on its spatial dimensions, a limit on resolution is unavoidably imposed by considerations of practicality. In addition, transducer arrays with individual discrete elements possess unfavorable characteristics if exposed to a nonstationary fluid medium. The periodicity of the arrangement of the individual transducer elements within the array is directly related to a strong response to flow-induced noise. This tends to impede considerably the performance of the transducer array when operating on a moving platform, such as surface ships or submarines.

A key advantage of the invention herein disclosed is reflected in the fact that only one pair of terminals are required, rather than one pair for each transducer element of a conventional array. This is a direct consequence of the manner in which the acoustic waves interact with electromagnetic waves in a new electrostatic transducer configuration. This new concept, the feasibility of which rests on the high ratio of the propagation speeds of electromagnetic and acoustic waves (the latter can be considered stationary in one sampling period), also offers significant advantages in the area of beamforming. The continuous sensitivity and relative smoothness of the transducer surface provides a high degree of flow-noise rejection if operated in a nonstationary fluid medium.

SUMMARY OF THE INVENTION

One embodiment of the invention relates to a distributed electrostatic transducer, which can be used in apparatus for mapping acoustic fields in the range of 10 Hz to 2 MHz. The transducer comprises a flat, substantially rectangular, metal plate, one surface of which is rough, the plate having a length generally in the range of 10 to 100 wavelengths of the acoustic frequency at which the mapping is to be done, and a width and thickness in the range of $0.05\lambda$ and $0.01\lambda$.

A rectangular strip of dielectric foil is disposed under surface tension on the rough surface of the metal plate so that the foil touches only the most protruding parts of the surface.

A long, narrow, rectangular, metallic strip is disposed on and attached to the dielectric foil; the strip being exposed to, and therefore defining, an acoustic pressure field. The metallic strip may be bonded to the upper side of the dielectric foil, the side opposite to the one touching the back plate, in the form of a metallization strip, which, together with the back plate, forms the strip transmission line for electromagnetic waves. The impedance of this strip transmission line depends on the width of the metallization and its average distance from the back plate.

A broader form of the invention involves apparatus useful for mapping acoustic pressure fields, which includes the distributed electrostatic transducer, as just described. A duplexer is electrically connected to the metallic strip and to the smooth side of the flat plate, is connectable to a source of electrical input signals, and has output terminals at which an output electrical signal may be measured.

The result being that, when an electrical signal having the form of a delta function is applied at the input to the duplexer, electromagnetic waves travel along the strip transmission line, the duplexer having the function of separating the returning signal reaching the output terminals of the duplexer from the applied signal which is interrogating the time. The returning signal contains two groups of frequencies: (1) low-frequency components indentical to those present in the acoustic pressure field; and (2) high-frequency components containing wave vectors, also present in the pressure field, the two components being readily separable, and hence the pressure field may be reconstructed.

OBJECTS OF THE INVENTION

An object of the invention is to provide an apparatus for and method of mapping acoustic pressure fields which can operate with high data rates, the apparatus not being unduly complex.

Another object of the invention is to provide an apparatus and method suitable for mapping acoustic pressure fields with high resolution and high speed.

Yet another object of the invention is to provide an apparatus for and method of mapping acoustic fields which does not require an array of transducers, with its attendant disadvantages, e.g. requiring a multitude of electrical connections, having resolution limited by the dimensions of the array, etc.

Other objects, advantages and novel features of the invention will become apparent from the following detailed description of the invention, when considered in conjunction with the accompanying drawings, wherein:

BRIEF DESCRIPTION OF THE DRAWINGS

FIG. 1 is a diagrammatic view of an apparatus for mapping an acoustic pressure field which includes a distributed electrostatic transducer.

FIG. 2 is a set of diagrammatic views of electrostatic transducers in the form of waveguides: FIG. 2A showing an open-sided waveguide; FIG. 2B showing a plate-mounted conformal waveguide sensor; and FIG. 2C showing a double-ridge waveguide.

FIG. 3 is a perspective view of a dielectric rod waveguide, which may also be used as a distributed acoustic sensor.

FIG. 4 is a pair of views of coaxial cables, which can also be used as distributed electrostatic transducers. FIG. 4A shows an ordinary shielded coaxial cable; while FIG. 4B shows a coaxial cable with two metallic foils.

FIG. 5 shows a schematic view of discrete transducer elements, which may also be used for acoustic pressure sensing.

DESCRIPTION OF THE PREFERRED EMBODIMENTS

Referring first to FIG. 1, this figure shows a distributed electrostatic transducer 10, in the form of a strip transmission line, which can be used in apparatus, described hereinbelow, for mapping acoustic fields in the range of 10 Hz to 2MHz. The transducer 10 comprises a flat, substantially rectangular, metal plate, or back plate 12, one surface 12S of which is rough, the plate having a length generally in the range of 10 to 100 wavelengths of the acoustic frequency at which the mapping is to be done, and a width and thickness in the range of $0.05\lambda$ and $0.01\lambda$, respectively. The purpose of the roughness is to get a controlled average separation. A rectangular strip of dielectric foil 14 is disposed under tension on the rough surface 12S of the metal plate 12 so that the foil touches only the most protruding parts of the surface. A long, narrow, rectangular, metallic strip 16 is disposed on and attached to the dielectric foil 14, the strip being exposed to, and therefore defining, an acoustic pressure field, indicated by the vertical arrows 17.

Describing the distributed electrostatic transducer 10 in more detail, the length of the metal plate 12, which may be porous stainless steel, depends upon the specific application of the apparatus 20, described hereinbelow. In general, the plate 12 must be at least several wavelengths long, for example, 10 wavelengths, and therefore its length would vary depending upon whether it were used in air, water or underground. For example, for use at a specific frequency, the length of the plate for use underwater would be shorter than for use in air, and shorter still for use underground. This is so because the resolution capability depends upon the wavelength and therefore upon the number of cycles incident upon the plate. In an application underwater for use at 20 kHz, the length of the plate would be in the range of 20 ft. In some other application, the length of the waveguide configuration could be one thousand ft.

The roughness of the back plate 12 is not critical but may be in the range of 10 microns. The surface of the back plate 12 may be smooth if shims, having a thickness in the range of 10 microns, are disposed at the edges of the plate 12 to keep the dielectric foil 14 spaced away from the plate. The foil 14 may be under tension to ensure that it does not sag and touch the plate 12. However, in other cases, the foil 14 may just lie on the back plate 12, and in operation electrostatic attraction will keep it against the back plate.

The metallic strip 16 may be of aluminum, of approximately the same length as, but shorter than, the plate 12, of one-third the width of the plate, and having a thickness in the range of 1 micron.

The dielectric foil 14 may be of made of Mylar, which is either copper-coated, aluminum-coated, silver-coated or coated with some other highly conductive metal, to hold down losses. The word "Mylar" is a trade name of E. I. DuPont de Nemours and Company, Incorporated, Wilmington, Del. 19898. This type of configuration would be alternative to the use of a separate Mylar foil 14 to which is attached the metallic strip 16. The foil 14 has a thickness in the range of 1 mil. There may be a coated dielectric foil on the bottom side of the back plate 12, forming a symmetrical electrostatic transducer, although this is not essential.

The elctrostatic transducer may also be made in a cylinderical configuration.

The distributed electrostatic transducer 10, as described may be used in apparatus 20 for mapping acoustic pressure fields. In FIG. 1, the reference numeral 20 includes all elements shown in FIG. 1, while reference numeral 10 designates all parts of the electrostatic transducer only. The apparatus 20 includes a duplexer 22 electrically connected, by leads 24U and 24L, to the metallic strip 16 and to the bottom surface 12B of plate 12. The duplexer 22 is connectable to a source of electrical input signals (not shown), by leads 26U and 26L, and has output terminals, 28U and 28L, at which an output electrical signal may be measured.

The result being that, when an electromagnetic delta function $\delta(t_o)$ is applied as the input to the duplexer 22, electromagnetic waves travel in both directions, as indicated by the horizontal arrows, along the strip transmission line 10, the duplexer having as a function permitting only the outgoing signal $E(t-t_o)$ to reach the output terminals, 28U and 28L, of the duplexer, the outgoing signal containing two groups of frequencies: (1) low-frequency components identical to those present in the acoustic pressure field, and (2) high-frequency components containing wave vectors, also present in the pressure field, the two components being readily separable, and hence the pressure field may be reconstructed or determined.

Referring now to FIG. 2A, therein is shown a distributed electrostatic transducer 30 having the configuration of an open-sided waveguide, comprising a metallic channel 32, having a base 32B and two flanges 32F perpendicular to the base, and a dielectric material 34 which is also an acoustic window fixedly disposed within the channel so as to completely fill the channel. An acoustic window has the same relationship to acoustic signals as clear glass, which is an optical window, has to signals having optical wavelengths.

Inasmuch as it is the dielectric material 34 which is exposed to the acoustic pressure field, the plate 36 is merely a support plate for the waveguide 30, and as such may be either a conductive or insulative material.

A hybrid tee, or magic tee, may be used in combination with the distributed electrostatic transducer 30 for signal direction control, instead of the duplexer 20 shown in FIG. 1.

FIG. 2B shows a distributed electrostatic transducer 40 in the form of a waveguide having a more complex structure, comprising a flanged metallic channel 50, which comprises a flat base 52, two sides 54, perpendicular to the base, and two outside flanges 56, one perpendicular to each side, each flange being partially undercut, or stepped, at region 57, so as to have a greater width in that region than the width between the two sides. Two end plates, or caps 58, only one of which is shown, are sealably mounted at each end of the waveguide 40, thereby forming a waveguide cavity.

A liquid dielectric 62 fills the smaller width of the waveguide cavity up to the region of the step 57. A liquid dielectric is used because it is easier to compensate for the hydrostatic pressure due to varying depths, although a solid dielectric such as polyethylene may also be used.

To seal the liquid dielectric 62, a plate 64 of porous metal, for example, stainless steel, having a thickness less than the depth of the undercut region 57 and a width slightly less than that of the width of the undercut area, and a metallized dielectric foil 66, attached to, and having the same area as, the porous plate are used, the foil fitting against the shoulder of the undercut in a manner to seal the liquid dielectric within the waveguide cavity. A nonporous metal plate is not used because it would have too high an acoustic impedance and poor vibrational characteristics. The porosity of the plate 64 provides adequate strength and good vibrational characteristics.

A rubber or neoprene plate, or blanket 68, having the same length and width as the dielectric foil 66, and having a thickness less than the depth of the undercut region 57, is sealably mounted within the waveguide cavity.

Referring now to FIG. 2C, this figure shows a double-ridged waveguide 70, comprising two metal flanges 72, partially enclosing what is known as a pressure-release material 74. A typical pressure-release material may be the Min-K 2000 material manufactured by the Johns-Mansville Co., of New York, N.Y., and consists essentially of a homogeneous mixture of silica particles of a submicron size in a phenolic binder.

As shown in FIG. 3, a dielectric waveguide may also be used as a distributed electrostatic transducer. The dielectric constant and the length must be such that every wave undergoes a total refraction, that is to say, an electrical signal entering the waveguide never leaves it. Due to the cylindrical cross-section, the response to the acoustic pressure waves is independent of the direction of the pressure field.

Referring now to FIG. 4, and first to FIG. 4A, this figure shows a coaxial line 90 which may be used as a distributed electrostatic transducer, for example, in a towed array. It comprises the usual central conductor 92, but should preferably be surrounded by a compliant dielectric 94 for maximum sensitivity to acoustic pressure waves. A typical compliant dielectric is polyethylene, Mylar and Teflon. The acoustic waves exert varying pressures on the external shield 96, which may or may not be surrounded by an insulating layer of compliant material.

Referring now to FIG. 4B, this figure shows a distributed electrostatic transducer in the form of a coaxial cable 100 which is more complex in structure than the one shown in FIG. 4A. The coaxial cable 100 comprises a central core 100, of steel, for example, to provide strength for the coaxial cable. A high-density core 104 surrounds the central core. The core 104 may be polystyrene, nylon or high-density polyurethane. An inner metallic foil 106, surrounding the high-density core 104, may be any highly conductive metal, such as silver, copper or aluminum. A pressure-release material 108, surrounding the inner metallic foil 106, may also be Min-K 2000, described hereinabove. An outer, highly conductive metallic foil 110, surrounds the pressure-release material 10 the coaxial cable to be neutrally buoyant. Optionally, the coaxial cable 100 may further comprise an outer compliant sheath 112 surrounding the outer metallic foil 110.

The thicknesses of the various components of the coaxial cable 100 are such that the cable is neutrally buoyant, in addition to being maximized optimally with respect to acoustic sensitivity, for frequencies up to several thousand kHz.

In yet another embodiment, as is shown in FIG. 5, the distributed electrostatic transducer 120 may comprise discrete transducer elements, such as condenser hydrophones 122. For applications above ground, the hydrophones 122 need not be insulated, but for use underwater they would have to be insulated.

A condenser hydrophone 122 is essentially a discrete capacitor, which changes its capacitance as the acoustic pressure field acting on it varies.

The inductors 124 have the function of introducing inductance into the distributed transducer 120 so that, above a certain cut-off frequency, it more closely approximates a transmission line.

Referring now back to FIG. 1, and discussing qualitatively what transpires in the embodiment 10 shown in this figure, the electric signal $E(t-t_0)$ which comes out of the transducer, after the electromagnetic pulse $\delta(t_0)$ is injected into it, describes the diffractions of the surface of the waveguide 10. Assume that the surface of the waveguide 10 is deflected at a certain distance $x$ from one end. Then the electrical signal which is reflected from the single deflected spot and returns to the duplexer 22, by means of lead 24U, after some delay, due to the transit time.

If the surface of the waveguide 10 has a more complicated diffraction pattern, then every minute change from the characteristic impedance $Z_0$ will scatter from all of the deflections, and a continuous pulse train will appear on the lead 24U, and moreover the envelope of the pulse train will be substantially the same as the derivative of the diffraction pattern, and therefore, the diffraction pattern may be reconstructed, that is to say, each of the deflections may be plotted as a function of distance $x$ from one end, from whence it follows that beam forming is possible.

Discussing now the mathematical relationships in the invention, if an acoustic pressure field $P(\underline{k},w)$ 17 defined by the wave vector $\underline{k}$ and the frequency $w$, consisting of $n$ harmonic components such that $$P(\underline{k},w) = \Sigma\, P_n\, exp\, i(\underline{k}\cdot\underline{x} - w_n t), \qquad (1)$$

is acting on the surface of the metallized dielectric foil, 14 and 16 in combination, the areas that are not in direct contact with the back plate 12 will be deflected. The letter $n$ equals the number of incident acoustic planar waves acting on the transducer simultaneously.

The deflection $D(x,t)$ as a function of location on the metallized strip, and time, can be obtained as $$D(x,t) = \frac{\alpha}{pc} \sum_n \frac{1}{w_n} P_n\, exp\, i(\underline{k}\cdot\underline{x} - wt) \qquad (2)$$

where $pc$ is the characteristic impedance of the medium and $\alpha$ a constant related to the compliance of the dielectric foil 14. This relation assumes point reacting properties of the dielectric foil 14 which are substantiated by its partial contact with the back plate 12.

The spatial-temporal deflection of the dielectric foil 14 causes local changes of the impedance of the strip transmission line 10, which in turn exhibits a spatial-temporal reflection coefficient to an electromagnetic wave. The dependence of this reflection coefficient $R(x,t)$ on the spatial-temporal deflection is approximately $$R(x,t) \sim \beta \, d/dx \, D(x,t), \qquad (3)$$

where $\beta$ is a constant of sensitivity.

Introducing the deflection $D(x,t)$, $$R(x_1,t) = \frac{\alpha\beta}{pc} \sum_n \frac{P_n}{c^1} \frac{k_n \cdot x}{k_n x} \exp i(k_n \cdot x - w_n t) \qquad (4)$$

where $C^1$ is the propagation speed of the acoustic signal in the medium. Equation (4) interrelates the spatial-temporal reflection coefficient along the strip transmission line 10 and the extremal acoustic pressure field 17. Mapping it is now reduced to the problem of sampling the reflection coefficient in space and time. This is done by applying an electromagnetic pulse of sufficiently short duration to the terminals of the strip transmission line.

As this pulse, which is approximated by a delta function $\delta(t_0)$ applied at the time $t_0$ propagates along the strip transmission line 10, distributed partial reflections occur, resulting in an electromagnetic wave travelling in the opposite direction. This wave arrives at the terminals, and is received as an electric signal conformal to the spatial-temporal reflection coefficient. The spatial variable $x$, however, is replaced by a new temporal variable t according to $$x = 1/2 \, ct, \qquad (5)$$

where $c$ is the propagation speed of the electromagnetic pulse in the strip transmission line. This electric signal, which is separated from the ingoing pulse by a duplexer (5), has the form $$E(t - t_0) = \frac{\alpha\beta}{pc} \sum_n \frac{P_n}{c^1} \frac{k_n \cdot x}{k_n x} \exp i w_n (\frac{1}{2} \frac{c}{c^1} \frac{k_n \cdot x}{k_n x} - 1) t \qquad (6)$$

It is only time dependent, exhibiting two groups of frequencies. The low frequency components $w_n$ which are identical to those present in the acoustic pressure field; and the high frequency components $$1/2 \, w_n c/c^1 k_n \cdot x/k_n x$$

containing the wave vectors $k_n$. Since their ratio is of the order of that of the propagation speeds of the acoustic and electromagnetic waves they can be easily separated, and hence the nature of the acoustic pressure field $P(k_1 w)$ ascertained and the field itself reconstructed.

The realization of the inventive concept herein disclosed is not restricted to straight strip transmission line. In some cases it may become necessary to utilize meandering or even a lumped element pattern to match a given electromagnetic resolution to the desired acoustic resolution.

The above description, for reasons of clarity, emphasized the one-dimensional sampling of the acoustic pressure field. It tacitly neglected the fact that two- or even three-dimensional sampling is necessary for mapping in the most general case. The concept can be readily extended to accommodate this additional requirement.

The delta-function like pulse applied to the terminals of the strip transmission line can be replaced by any other signal commensurate with the resolution requirements.

Obviously many modifications and variations of the present invention are possible in the light of the above teachings. It is therefore to be understood that within the scope of the appended claims the invention may be practiced otherwise than as specifically described.

What is claimed is:

1. Apparatus useful for mapping acoustic pressure fields in the range of 10 Hz to 2 MHz, comprising:
    a distributed electrostatic transducer, functioning as a strip transmission line, which includes:
    a flat, substantially rectangular, metal plate, one surface of which is rough, the plate having a length generally in the range of 10 to 100 wavelengths of the acoustic frequency at which the mapping is to be done, and a width and thickness in the range of $0.01\lambda$ to $0.05\lambda$;
    a rectangular strip of dielectric foil disposed under surface tension on the rough surface of substantially the entire metal plate so that the foil touches only the most protruding parts of the surface; and
    a long, narrow, rectangular, metallic strip disposed on and attached to the dielectric foil, the strip being exposed to, and therefore defining, an acoustic pressure field; and
    a duplexer, electrically connected to the metallic strip and to the flat plate, connectable to a source of electrical input signals, and having output terminals at which an output electrical signal may be measured;
    with the result that, when an electromagnetic delta function $\delta(t_0)$ is applied at the input to the duplexer, electromagnetic waves travel in both directions along the strip transmission line, the duplexer having the function of separating the signal reaching the output terminals of the duplexer from the applied signal $[E(t-t_0)]\delta(t_0)$ which is interrogating the line, the returning signal containing two groups of frequencies:
     1. low frequency components $w_n$ identical to those present in the acoustic pressure field, and
     2. high-frequency components containing wave vectors $k_n$, also present in the acoustic pressure field, the two components being readily separable, because of the great differences in their frequencies, and hence any specific pressure field $P(k, w)$ may be reconstructed.

2. The apparatus according to claim 1, wherein the distributed electrostatic transducer includes the following properties:

the metal plate is of porous stainless steel;
the roughness of the plate is in the range of 10 microns;
the dielectric foil is made of polyethylene terephthalate, having a thickness in the range of 1 mil;
the metallic strip is of aluminum, of approximately the same length as, but shorter than, the plate, of one-third the width of the plate, and having a thickness in the range of 1 micron.

* * * * *